April 30, 1968 C. F. STUTE 3,380,740

PHONOGRAPH ELEVATION MECHANISM

Filed May 4, 1966 2 Sheets-Sheet 1

INVENTOR.
Carlton F. Stute

BY Nicholas A. Camasto

ATTY.

April 30, 1968 C. F. STUTE 3,380,740

PHONOGRAPH ELEVATION MECHANISM

Filed May 4, 1966 2 Sheets-Sheet 2

INVENTOR.
Carlton F. Stute
BY Nicholas A. Camasto
ATTY.

3,380,740
PHONOGRAPH ELEVATION MECHANISM
Carlton F. Stute, Riverdale, Ill., assignor to Admiral Corporation, Chicago, Ill., a corporation of Delaware
Filed May 4, 1966, Ser. No. 547,557
1 Claim. (Cl. 274—2)

ABSTRACT OF THE DISCLOSURE

A mechanism for elevating a phonograph turntable and its associated controls to a level of operating convenience upon opening a console cabinet lid, and lowering the turntable and controls upon closing the lid.

This invention relates in general to enclosures in which operative means, normally recessed therein, may be relocated to a position of greater operating convenience, and in particular to a cabinet having a deck carrying a relatively inaccessible phonograph record playing mechanism and its accompanying controls, wherein the deck is readily movable to a more accessible height. More particularly, this invention relates to a low cabinet having a vertically movable record playing mechanism mounted therein at a convenient height for operation and automatically recessible within the cabinet upon closing its hinged lid.

A styling trend in many varieties of formal furniture is in the direction of longer and lower cabinets. This trend extends to cabinets for housing phonograph record playing mechanisms and accompanying components such as amplifiers and loudspeaker systems.

Conventional record changing mechanisms utilize a record supporting spindle of substantial height to support and sequentially feed phonograph records to the turntable. The spindle height has been generally incompatible with the styling trend of lower cabinets, since adequate clearance between it and the hinged cabinet lid typically required recessing the record changer deep in the cabinet. This resulted in an assembly which was extremely inconvenient and awkward to operate, since the operator had to stoop to an uncomfortable position to change the phonograph records, manually adjust the tone arm, or operate the amplifier controls. Also, the recessed record player required supplementary illumination to facilitate operation since the cabinet usually shadowed a substantial portion of the ambient light.

This invention obviates many of the difficulties inherent in low cabinets for phonograph record playing mechanisms, by providing means for vertically moving the mechanism from a normally recessed location within the cabinet during non-operation thereof, to an elevated location adjacent the cabinet top during manual operation. The record playing mechanism ts guided by friction reducing glides, and the weight of the entire movable assembly, including the cabinet lid, is counterbalanced by a spring biased, lazy-tong mechanism. Stay arms are provided to synchronize the position of the hinged lid and the location of the phonograph mechanism, so when the lid is in its closed position the record changing mechanism is recessed within the cabinet, and when the lid is opened the mechanism is elevated to a level adjacent the cabinet top.

Accordingly, it is the primary object of this invention to provide means for vertically supporting and moving a control center from a non-convenient location during non-operation thereof, to a more convenient location for manual operation.

Another object of this invention is to provide a record changing mechanism which is vertically movable from a recessed location within a cabinet during non-operation thereof, to an elevated location of convenient operation.

An additional object of this invention is to provide a vertically movable phonograph record playing mechanism and a spring biased lazy-tong mechanism to facilitate movement thereof.

A further object of this invention is to provide a vertically movable record playing mechanism recessed within a cabinet beneath its hinged lid, and means synchronizing movement of the mechanism with the cabinet lid.

It is also an object of this invention to provide a cabinet having a record playing mechanism which may be vertically shifted without the requirement of horizontal movement, thereby saving cabinet space.

Other objects of this invention will become apparent upon an examination of the following description taken in conjunction with the accompanying drawings wherein.

Figures 1, 2:
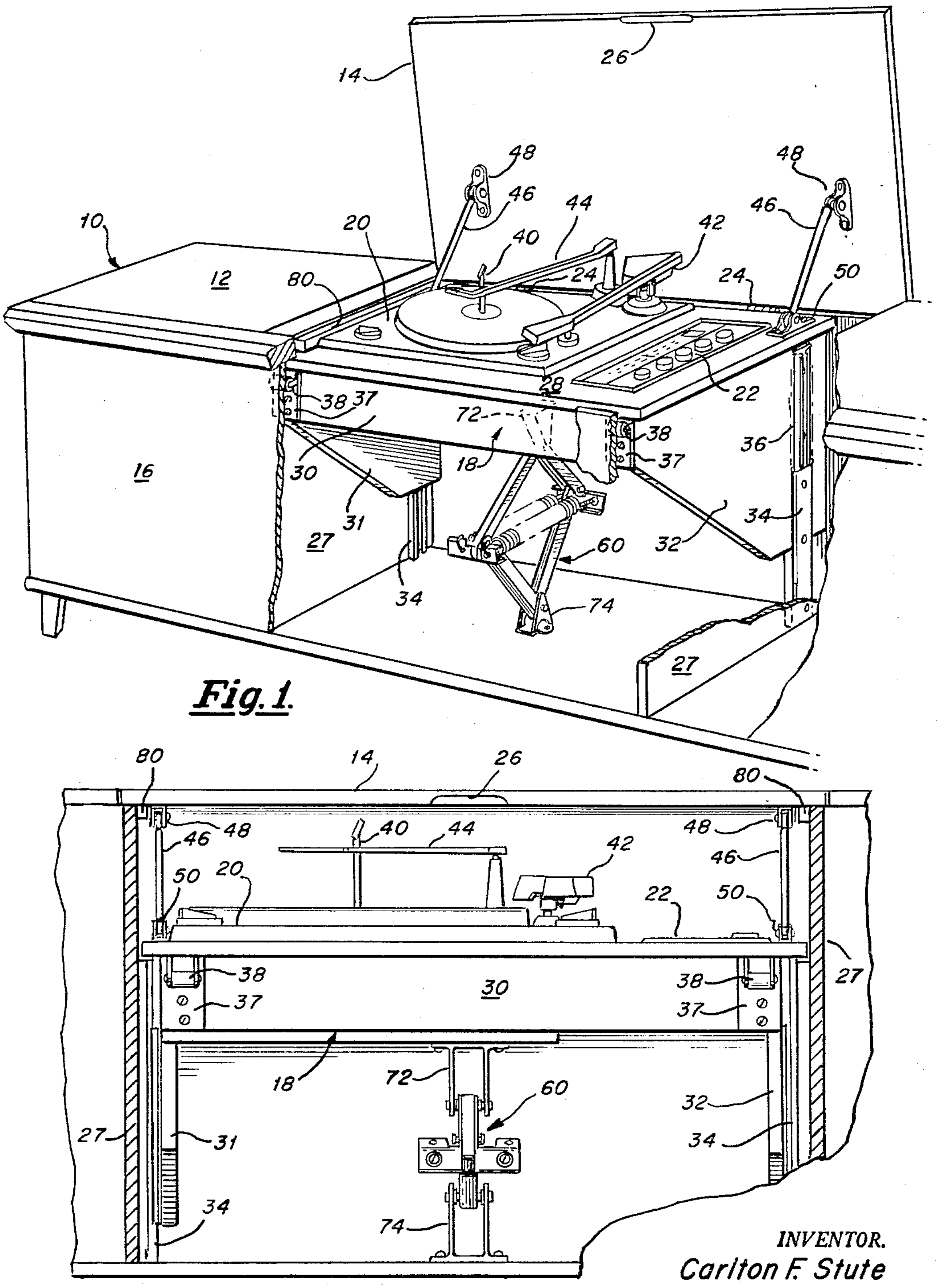
FIG. 1 is a three dimensional partially cut away front view of a cabinet in which the invention is incorporated. The cabinet lid is shown in its open position with the deck at its elevated level thereby exposing the record playing mechanism and amplifier.
FIG. 2 is a partially cut away front elevation view of the cabinet of FIG. 1, but with the cabinet lid closed and the deck at its lower level.

Turning to consideration of the drawings and in particular to FIG. 1 there is shown a low cabinet generally referred to by reference numeral 10 which may be manufactured of wood or the like, and has an aesthetic appearance conventionally found in furniture suitable for use in a living room. The cabinet essentially comprises a top 12 having a movable lid 14, a front 16, and a movable deck 18 carrying a phonograph record playing mechanism 20. If desired, the deck may also carry an amplifier and controls 22. The movable lid is secured to the rear of the cabinet by hinges 24, and a lifting handle 26, which may consist of an undercut portion of the lid, is provided adjacent the front. Interior cabinet walls 27 are provided to define the cavity wherein the deck is recessed.

Deck 18 is located in the center of the cabinet and includes a shelf 28, having a skirt comprising a front 30, and sides 31 and 32. The deck is guided and partially supported for vertical movement by two friction reducing glides, one located on each side of the deck. Each glide has an outer stationary channel 34 secured to interior cabinet walls 27, and a telescopic inner channel 36 secured to sides 31 and 32.

The glides are located behind the center of gravity of the deck, record changer, and amplifier, causing the deck to lean toward the cabinet front. A pair of brackets 37 having rollers 38 rotatably secured thereto are affixed to the edges of front skirt 30. These rollers bear against the interior surface of front 16 and assist in maintaining the deck substantially horizontal.

Still referring to FIG. 1 with the deck at its elevated level, the phonograph record playing mechanism includes a record supporting spindle 40 extending above the surface of top 12. In addition, a tone arm 42 and record stabilizing member 44, also extend above the surface of top 12 and must not interfere with the lid in its closed position.

A pair of stay arms 46 are pivotably secured to the lid at 48 and to the deck at 50. These stay arms are the only interconnection between the lid and the deck and serve to synchronize the movements thereof. The stay arms also assist in retaining the lid in its open position without additional hardware other than the counterbalance to be described below.

The point of connection between the stay arms and the deck is extremely important since the glides are not at the center of gravity of the deck and its components. The glides would normally bind and hinder smooth movement of the deck unless the connections 50 are located directly above the glides. Thus, any lifting force exerted by the lid and stay arms is directly in line with the glides eliminating a torsional moment which could cause twisting.

Referring now to FIG. 2, the deck and its components are illustrated at their recessed location within the cabinet with the lid in its closed position. The deck is sufficiently recessed within the cabinet to provide adequate clearance between the upwardly protruding record changer structure, especially record supporting spindle 40, and the lid 14.

The movable deck and the components which it carries comprise a dead weight of approximately 30 pounds in a typical installation, although the weight would vary with the number and type of components carried. This load is extremely burdensome and possibly dangerous to move merely by opening the lid and lifting the deck with stay arms 46. In addition, the stay arms would be in tension presenting a difficult problem of adequately securing them to the lid and deck while lifting such a relatively heavy weight.

Figure 3:
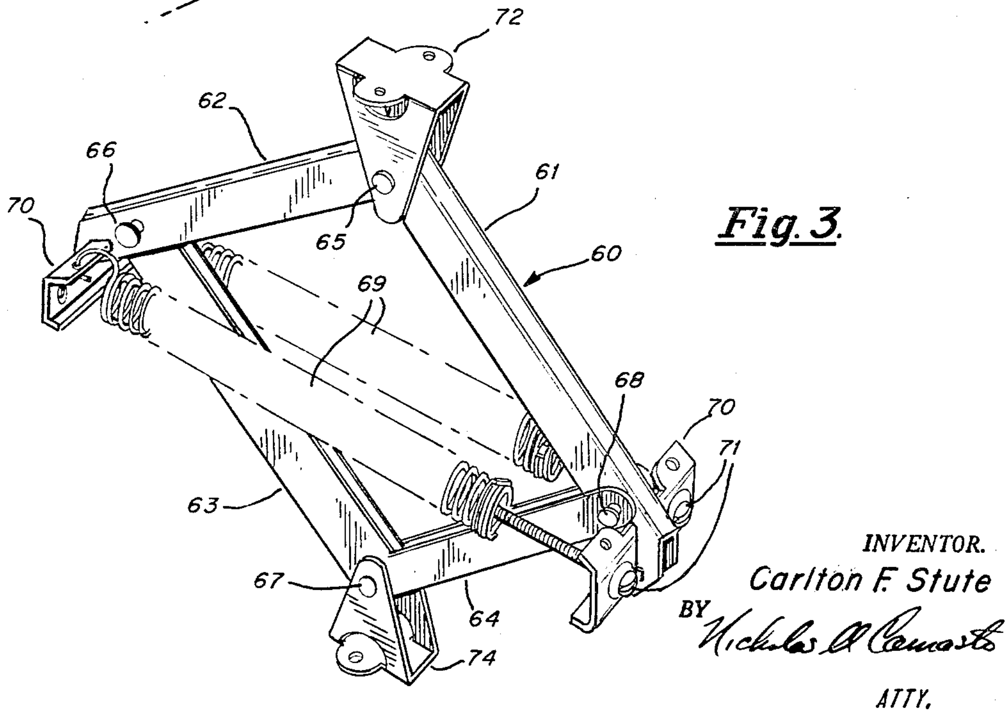
FIG. 3 is a three dimensional view of the counterbalance assembly shown in FIG. 1.

To overcome these difficulties, a counterbalance 60, (shown in detail in FIG. 3), is provided to relieve the dead weight of the deck and components. The counterbalance comprises a combination of links 61, 62, 63, and 64, arranged to form a parallelogram which is known in the art as a lazy-tong mechanism. The end of each link is pivotably connected to the end of each adjacent link at pivots 65, 66, 67, and 68. A pair of tension springs 69 are secured to spring plates 70 adjacent pivots 66 and 68 to bias these corners together. The tension of springs 69 may be varied to balance the deck weight by adjusting spring screws 71 threaded through spring plates 70 and one end of each tension spring. The lazy-tong mechanism is fastened to the underside of deck 18 by an upper bracket 72, and is secured to the cabinet bottom by an identically shaped lower bracket 74.

As is well known by those knowledgeable in the art of mechanical linkages, the reaction force exerted across two diagonally opposed corners of a lazy-tong mechanism is a function of ½ the tangent of the angle formed by the links at the remaining two corners where the force is applied. Thus, in the lazy-tong mechanism illustrated in FIG. 3, a maximum vertical force is exerted against the deck when the mechanism is in its most extended position such as that shown in FIG. 1, since the tangent of ½ the angle at pivot 66 or 68 is a maximum. A maximum force while the deck is at its elevated level is desirable to assist in maintaining the deck immovable while an operator is changing phonograph records or tuning the amplifier. On the other hand, when the mechanism is compressed and springs 68 are in the condition of greatest tension, the vertical force against the now lowered deck is a minimum which prevents the deck from being unintentionally pushed upward.

A molding 80 (FIG. 1) secured about the inside of cabinet 10 limits the upward motion of the deck and lid. The molding is extended around the inside periphery of the cabinet adjacent the top, and assists in maintaining the deck at a horizontal attitude.

Figure 4:
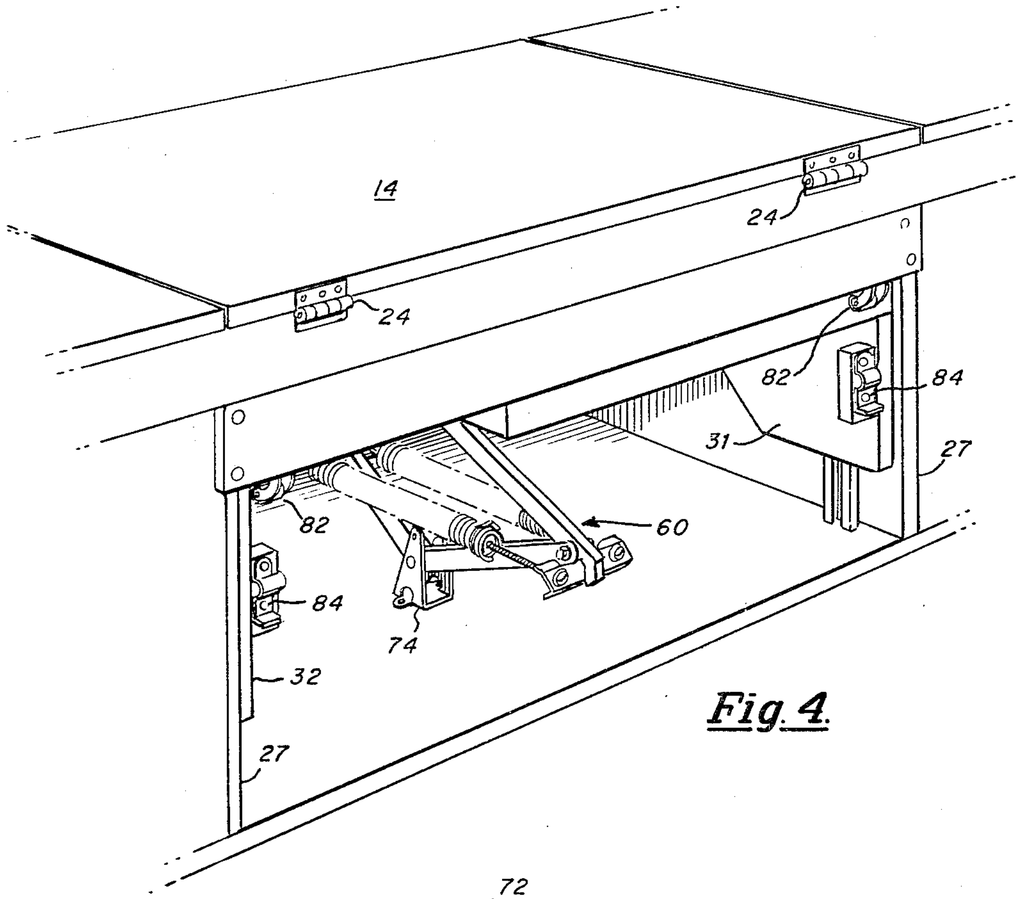
FIG. 4 is a three dimensional rear view of the center of the cabinet of FIG. 1, with the deck at its lower level and the lid in its closed position.

Referring now to FIG. 4, a pair of rollers 82 are permanently fastened to the rear of cabinet 10, one adjacent each glide 34. Detent clips 84 are secured to each side 31 and 32, in line with rollers 82. As the deck is lifted from the recessed location of FIG. 4, each detent clip 84 moves into engagement with its respective roller thereby preventing unintentional movement of the deck and lid during operation of the record changer and amplifier.

What has been described is a cabinet of low design having a novel, vertically movable deck, carrying a phonograph record playing mechanism and amplifier. Movement of the deck and lid is synchronized, and the weight of the movable assembly is counterbalanced by a spring biased lazy-tong mechanism which exerts a maximum force against the deck when at its elevated position where the record changing mechanism may be more conveniently operated without excessive stooping. The lazy-tong mechanism exerts a minimum force on the deck when it is fully recessed within the cabinet with the lid in its lowered position, thereby preventing accidental elevation.

It is obvious that upon study by those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claim.

The embodiments of the invention in which an exclusive property or privilege is claimed are defined as follows:

1. In combination: a cabinet having a hinged lid movable between a closed position and an open position: a horizontally disposed deck, carrying a phonograph record playing mechanism, including an upwardly extending record supporting spindle and control equipment, mounted for vertical movement within said cabinet beneath said lid: guide means restricting said deck to vertical movement: counterbalance means facilitating deck movement between an elevated level for user convenience when said lid is in said open position and a lower level within said cabinet when said lid is in said closed position, said counterbalance means comprising; a lazy-tong mechanism having four intersecting links pivotably connected at each intersection to form a single parallelogram; spring means forming a horizontal diagonal across said parallelogram biasing two opposite pivots together, the remaining two pivots being in substantially vertical alignment; first and second mounting brackets respectively supporting the remaining two pivots, said first bracket being secured to a lower portion of said cabinet and said second bracket being secured to the underside of said deck, said counterbalance exerting a relatively small force on said deck when said deck is at said lower level and a relatively large force thereon when said deck is at said elevated level; arm means connecting said lid and said deck for synchronizing movements therebetween, said arm means being connected to said deck at a point in substantially vertical alignment with said guide means; detent means secured to said deck precluding movement thereof during operation of said record playing mechanism at said elevated level: and manual adjustment means included in said spring means for adjusting the tension thereof to select the magnitude of said forces exerted by said lazy-tong mechanism in accordance with the weight of the components supported by said deck and the frictional forces exerted by said guide means whereby very little external force need be exerted to move said deck between said two position.

References Cited

UNITED STATES PATENTS

| | | | |
|---|---|---|---|
| 1,568,165 | 1/1926 | Karp | 312—272.5 |
| 1,457,744 | 6/1923 | Newman et al. | 312—25 |
| 2,125,777 | 8/1938 | Estrates et al. | 312—272.5 X |
| 2,637,614 | 5/1953 | Simos | 312—272.5 |

FOREIGN PATENTS

| | | |
|---|---|---|
| 150,836 | 9/1937 | Austria. |
| 822,174 | 9/1937 | France. |
| 742,071 | 12/1955 | Great Britain. |

HARRY N. HAROIAN, *Primary Examiner.*